United States Patent
Nakagawa et al.

(10) Patent No.: US 11,167,846 B2
(45) Date of Patent: Nov. 9, 2021

(54) INFORMATION PROCESSING APPARATUS

(71) Applicant: NTT DOCOMO, INC., Tokyo (JP)

(72) Inventors: Hiroshi Nakagawa, Tokyo (JP); Kazuhiro Yamada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/753,411

(22) PCT Filed: Oct. 24, 2018

(86) PCT No.: PCT/JP2018/039475
§ 371 (c)(1),
(2) Date: Apr. 3, 2020

(87) PCT Pub. No.: WO2019/082924
PCT Pub. Date: May 2, 2019

(65) Prior Publication Data
US 2021/0155342 A1    May 27, 2021

(30) Foreign Application Priority Data
Oct. 27, 2017   (JP) .............................. JP2017-208309

(51) Int. Cl.
*B64C 39/02*   (2006.01)
*H04N 7/18*    (2006.01)

(52) U.S. Cl.
CPC .......... *B64C 39/024* (2013.01); *H04N 7/183* (2013.01); *B64C 2201/027* (2013.01); *B64C 2201/123* (2013.01); *B64C 2201/146* (2013.01)

(58) Field of Classification Search
CPC ............ B64C 39/024; B64C 2201/146; B64C 2201/123; B64C 2201/14;
(Continued)

(56) References Cited

U.S. PATENT DOCUMENTS

| | | | |
|---|---|---|---|
| 2017/0183105 A1* | 6/2017 | Fournier | .............. G08G 5/0052 |
| 2017/0221454 A1 | 8/2017 | Kim et al. | |
| 2019/0176967 A1 | 6/2019 | Ohata et al. | |

FOREIGN PATENT DOCUMENTS

| | | |
|---|---|---|
| JP | 2010061346 A | 3/2010 |
| JP | 2014104797 A | 6/2014 |

(Continued)

OTHER PUBLICATIONS

International Search Report issued in corresponding PCT Application No. PCT/JP2018/039475, dated Dec. 25, 2018, 3 pages.
(Continued)

*Primary Examiner* — Obafemi O Sosanya
(74) *Attorney, Agent, or Firm* — MKG, LLC (57) ABSTRACT

Piloting assistance from a remote location is provided to a pilot of a flight vehicle. A server selects captured images. The captured images include flight vehicle viewpoint images that were captured by an image capturing function of the flight vehicle, or pilot viewpoint images that were captured by an image capturing apparatus and show the flight of the flight vehicle. The server provides selected captured images to an assister terminal with priority. The server determines the display with priority based on information related to the flight of the flight vehicle. For example, the server determines the captured images that are to be displayed with priority based on a state during the flight of the flight vehicle. States include, for example, the altitude, speed, orientation, battery amount, and motor rotation speeds of the flight vehicle, as well as the distance between the flight vehicle and a work object.

20 Claims, 5 Drawing Sheets

(58) Field of Classification Search
CPC ........ B64C 2201/027; B64C 2201/021; H04N 7/183; H04N 7/185
See application file for complete search history.

(56) References Cited

FOREIGN PATENT DOCUMENTS

| | | |
|---|---|---|
| JP | 2017141010 A | 8/2017 |
| JP | 2017151008 A | 8/2017 |
| WO | 2017170148 A1 | 10/2017 |

OTHER PUBLICATIONS

Notices of Reasons for Refusal issued in corresponding Japanese Patent Application No. 2019-551195, dated Mar. 2, 2021.

* cited by examiner

| ALTITUDE | DISPLAY TARGET IMAGE |
|---|---|
| H OR HIGHER | FLIGHT VEHICLE VIEWPOINT IMAGE |
| BELOW H | PILOT VIEWPOINT IMAGE |

| SPEED | DISPLAY TARGET IMAGE |
|---|---|
| V OR HIGHER | PILOT VIEWPOINT IMAGE |
| BELOW V | FLIGHT VEHICLE VIEWPOINT IMAGE |

| ORIENTATION | DISPLAY TARGET IMAGE |
|---|---|
| TILT U OR HIGHER | PILOT VIEWPOINT IMAGE |
| BELOW TILT U | FLIGHT VEHICLE VIEWPOINT IMAGE |

| BATTERY AMOUNT | DISPLAY TARGET IMAGE |
|---|---|
| E OR HIGHER | FLIGHT VEHICLE VIEWPOINT IMAGE |
| BELOW E | PILOT VIEWPOINT IMAGE |

| MOTOR ROTATION SPEED | DISPLAY TARGET IMAGE |
|---|---|
| M OR HIGHER | PILOT VIEWPOINT IMAGE |
| BELOW M | FLIGHT VEHICLE VIEWPOINT IMAGE |

| DISTANCE TO WORK OBJECT | DISPLAY TARGET IMAGE |
|---|---|
| L OR HIGHER | PILOT VIEWPOINT IMAGE |
| BELOW L | FLIGHT VEHICLE VIEWPOINT IMAGE |

INFORMATION PROCESSING APPARATUS

TECHNICAL FIELD

The present invention relates to providing piloting assistance for a pilot of a flight vehicle.

BACKGROUND ART

As one example of technology for controlling a flight vehicle, JP 2014-104797A discloses a system in which light emitted from a light emitter provided in a flight vehicle is tracked by a camera provided on a moving mechanism in order to capture images of the flight state of the flight vehicle, and the captured images are displayed at a remote location.

SUMMARY OF INVENTION

Technical Problem

Various types of services that employ flight vehicles called drones have become prevalent in recent years. Under such circumstances, consideration is being given to systems for remotely providing piloting assistance to a pilot who is inexperienced with the piloting of a flight vehicle. In view of this, an object of the present invention is to provide a system that can easily provide piloting assistance to a pilot of a flight vehicle from a remote location.

Solution to Problem

In order to solve the foregoing problems, the present invention provides an information processing apparatus including: a first acquisition unit configured to acquire a captured image captured by an image capturing apparatus provided in a flight vehicle; a second acquisition unit configured to acquire a captured image that shows flight of the flight vehicle; and a priority display control unit configured to cause the captured image acquired by the first acquisition unit or the captured image acquired by the second acquisition unit to be displayed with priority on a terminal for a piloting assister who assists piloting performed by a pilot of the flight vehicle.

An aspect is possible in which the priority display control unit determines the captured image that is to be displayed with priority based on information related to flight of the flight vehicle.

An aspect is possible in which the priority display control unit determines the captured image that is to be displayed with priority based on a state during flight of the flight vehicle.

An aspect is possible in which the priority display control unit determines the captured image that is to be displayed with priority based on information related to piloting performed by the pilot.

An aspect is possible in which the priority display control unit determines the captured image that is to be displayed with priority based on a piloting-related attribute of the pilot or the piloting assister.

An aspect is possible in which the priority display control unit determines the captured image that is to be displayed with priority based on information related to piloting assistance provided by the piloting as sister.

An aspect is possible in which in a case where there are a plurality of the terminals for a piloting assister, for each of the terminals, the priority display control unit determines the captured image that is to be displayed with priority in accordance with a method determined for the terminal.

An aspect is possible in which the priority display control unit further causes information related to flight of the flying flight vehicle to be displayed on the terminal for the piloting assister.

An aspect is possible in which the priority display control unit further causes information related to delay in data communication between own apparatus and the terminal for the piloting assister to be displayed on the terminal for the piloting assister.

An aspect is possible in which in a case where there are a plurality of the flight vehicles and the pilots, the first acquisition unit acquires captured images captured by the image capturing apparatuses provided in the flight vehicles, the second acquisition unit acquires captured images showing flight of the flight vehicles, and for each of the flight vehicles, the priority display control unit selects the captured image acquired by the first acquisition unit or the captured image acquired by the second acquisition unit in accordance with an objective of piloting assistance for the pilot of the flight vehicle, and causes the selected captured image to be displayed with priority on the terminal for the piloting as sister.

According to the present invention, it is possible to easily provide piloting assistance to a pilot of a flight vehicle from a remote location.

DETAILED DESCRIPTION OF PREFERRED EMBODIMENTS

Configuration

Figure 1:
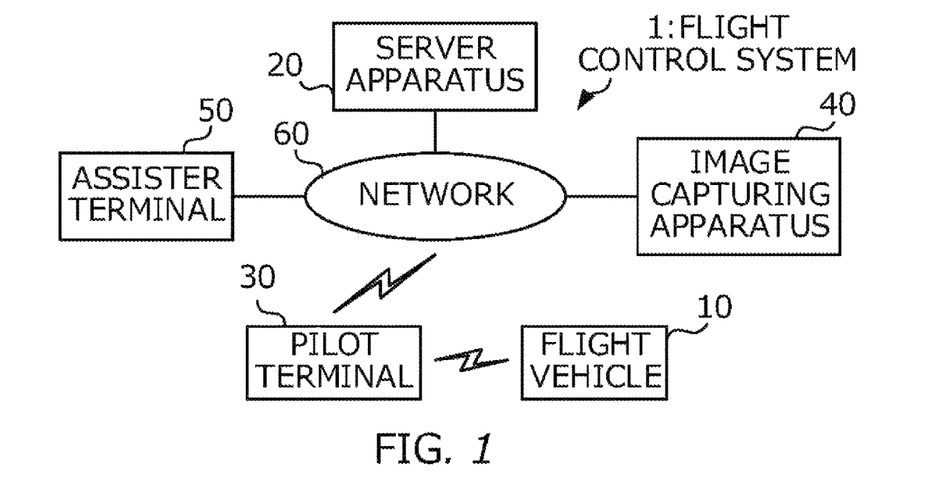
FIG. 1 is a diagram showing an example of the configuration of flight control system.

FIG. 1 is a diagram showing an example of the configuration of flight control system 1. Flight control system 1 is a system for controlling the flight of flight vehicle 10. Flight control system 1 includes flight vehicle 10, server apparatus 20, pilot terminal 30, image capturing apparatus 40, assister terminal 50, and network 60. Flight vehicle 10 is a flight-capable apparatus called a drone for example, and includes an image capturing function for capturing a moving image of its surroundings. The images captured with this image capturing function are images from the viewpoint of flight vehicle 10, and will hereinafter be called flight vehicle viewpoint images.

Pilot terminal 30 is a terminal for allowing a pilot to pilot flight vehicle 10 while viewing flight vehicle 10. Pilot terminal 30 is wirelessly connected to flight vehicle 10 and gives operation instructions thereto by transmitting wireless signals that correspond to operations performed by the pilot to the flight vehicle 10.

Image capturing apparatus 40 is a camera for example, and captures a moving image of the flight of flight vehicle 10. This image capturing apparatus 40 includes pan and tilt functions, and by using image recognition technology to analyze the captured images and recognize flight vehicle 10 in the captured images, and then controlling the pan and tilt functions, image capturing apparatus 40 can change the shooting direction during image capturing so as to follow the recognized flight vehicle 10. This image capturing apparatus 40 may be a fixed image capturing apparatus that is disposed on the ground below the airspace of flight vehicle 10, or may be a portable image capturing apparatus that can be carried by a person. Also, image capturing apparatus 40 and pilot terminal 30 may be integrated. In the present embodiment, image capturing apparatus 40 is portable, and is placed near the pilot and captures images of the space including flight vehicle 10. The images captured by image capturing apparatus 40 include substantially the same field of view as the case of viewing the flight of flight vehicle 10 from the viewpoint of the pilot, and will hereinafter be called pilot viewpoint images.

Assister terminal 50 is a terminal for allowing a piloting assister to remotely assist the piloting of the flight vehicle by the pilot. As sister terminal 50 includes a display function and can display the aforementioned flight vehicle viewpoint images or pilot viewpoint images. The piloting assister assists the piloting performed by the pilot, by operating assister terminal 50 while viewing such images.

Server apparatus 20 is an information processing apparatus that functions as a control platform for controlling the flight of flight vehicle 10, and causes either the flight vehicle viewpoint images captured through the image capturing function of flight vehicle 10 or the pilot viewpoint images of the flight of flight vehicle 10 captured by image capturing apparatus 40 to be displayed with priority on assister terminal 50. Here, "displayed with priority" means that the one type of captured images that are to be displayed with priority will be displayed on assister terminal 50 in a manner of being more visible or comprehensible to the user than the other type of captured images, and examples of this include an aspect for displaying the priority captured images and not displaying the other captured images, an aspect for displaying the priority captured images at a larger size than the other captured images, an aspect for displaying the priority captured images at an earlier time than the other captured images, and an aspect for displaying the priority captured images in a more visually emphasized manner than the other captured images.

Server apparatus 20, pilot terminal 30, image capturing apparatus 40, and assister terminal 50 are connected wirelessly or by wire in network 60 so as to be able to communicate with each other. In order to realize low-latency data transfer, it is desirable that network 60 is a closed network.

Figure 2:
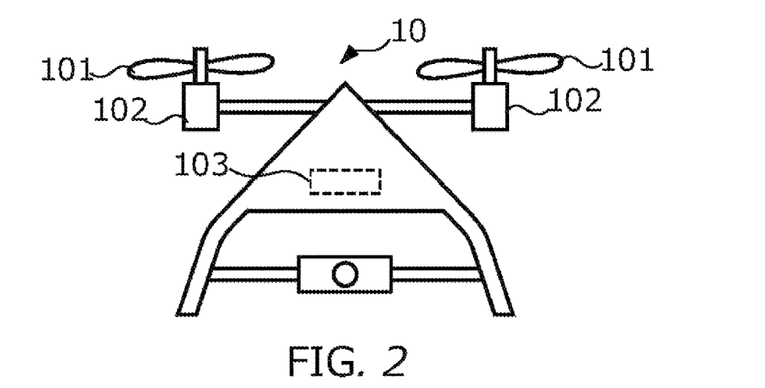
FIG. 2 is a diagram showing an example of the appearance of flight vehicle.

FIG. 2 is a diagram showing an example of the appearance of flight vehicle 10. Flight vehicle 10 is also called a drone for example, and includes propellers 101, driving apparatuses 102, and battery 103.

Propellers 101 rotate around shafts. Flight vehicle 10 flies due to rotation of propellers 101. Driving apparatuses 102 give motive power to propellers 101 to cause rotation thereof. Driving apparatuses 102 each include a motor and a transmission mechanism for transmitting motive power from the motor to the propeller 101, for example. Battery 103 supplies electric power to units of flight vehicle 10, including driving apparatuses 102.

Figure 3:
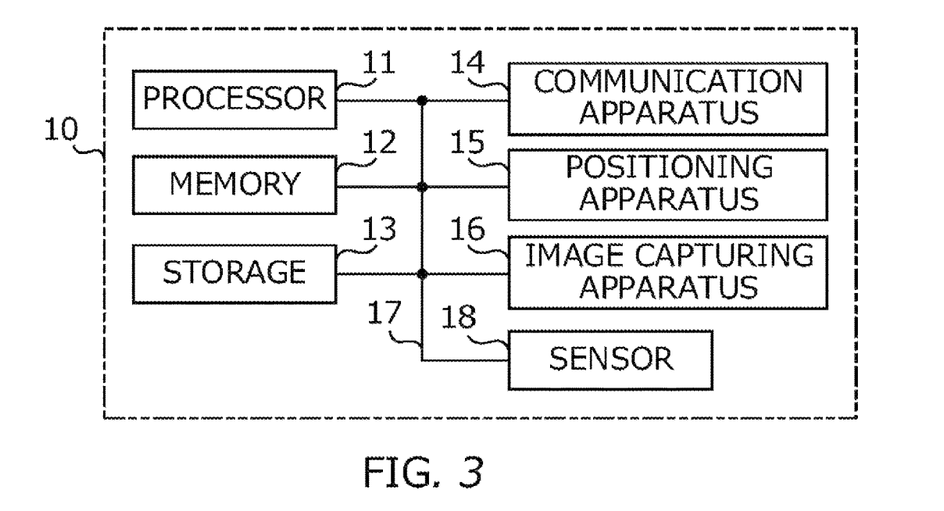
FIG. 3 is a diagram showing a hardware configuration of flight vehicle.

FIG. 3 is a diagram showing the hardware configuration of flight vehicle 10. Flight vehicle 10 is physically configured as a computer apparatus that includes processor 11, memory 12, storage 13, communication apparatus 14, positioning apparatus 15, image capturing apparatus 16, sensor 18, bus 17, and the like. Note that in the following description, the term "apparatus" can be replaced with terms such as circuit, device, and unit.

Processor 11 runs an operating system and performs overall control of the computer, for example. Processor 11 may be configured by a CPU (Central Processing Unit) that includes a control apparatus, an arithmetic operation apparatus, a register, an interface for peripheral apparatuses, and the like.

Also, processor 11 reads out programs (program code), software modules, and data from storage 13 and/or communication apparatus 14 to memory 12, and accordingly executes various types of processing. One program is a program for causing the computer to execute at least part of the operations of flight vehicle 10. The various types of processing executed in flight vehicle 10 may be executed by one processor 11, or may be executed by two or more processors 11 simultaneously or consecutively. Processor 11 may be mounted on one or more chips. Note that the program may have been transmitted from the network via an electrical communication line.

Memory 12 is a computer-readable recording medium, and may be configured by one or more of a ROM (Read Only Memory), an EPROM (Erasable Programmable ROM), an EEPROM (Electrically Erasable Programmable ROM), a RAM (Random Access Memory), and the like. Memory 12 may be called a register, a cache, a main memory (main storage apparatus), or the like. Memory 12 can hold, for example, software modules and programs (program code) that can be executed in order to carry out a flight control method according to an embodiment of the present invention.

Storage 13 is a computer-readable recording medium, and may be configured by at least one of an optical disc such as a CD-ROM (Compact Disc ROM), a hard disk drive, a flexible disk, a magneto-optical disk (e.g., a compact disk, a digital versatile disk, or a Blu-ray (registered trademark) disk), a smart card, a flash memory (e.g., a card, a stick, or a key drive), a Floppy (registered trademark) disk, and a magnetic strip. Storage 13 may also be called an auxiliary storage apparatus.

Communication apparatus 14 is hardware for performing wireless communication with pilot terminal 30.

Positioning apparatus 15 measures the three-dimensional position of flight vehicle 10. For example, positioning apparatus 15 is a GPS (Global Positioning System) receiver and measures the current position of flight vehicle 10 based on GPS signals that are received from a plurality of satellites.

Image capturing apparatus 16 captures images of the surroundings of flight vehicle 10. For example, image capturing apparatus 16 is a camera, and captures images by forming an image on an imaging element with use of an optical system. Image capturing apparatus 16 captures images of a predetermined range in front of flight vehicle 10 for example. It should be noted that the image capturing direction of image capturing apparatus 16 is not limited to being in front of flight vehicle 10, and may be above, below, or behind flight vehicle 10. Also, the image capturing direction may be changed by rotation of a platform that supports image capturing apparatus 16, for example.

Sensor 18 is a device for sensing various states of flight vehicle 10, and detects the altitude of flight vehicle 10, the speed of flight vehicle 10, the orientation of flight vehicle 10, the battery amount of flight vehicle 10, the motor rotation speeds of flight vehicle 10, and the distance between flight vehicle 10 and a work object, for example. Note that in the case where flight vehicle 10 is capturing images of a building for example, the work object is that building.

Apparatuses such as processor 11 and memory 12 described above are connected by bus 17 in order to exchange information. Bus 17 may be configured by a single bus, or may be configured by different buses that connect apparatuses.

Figure 4:
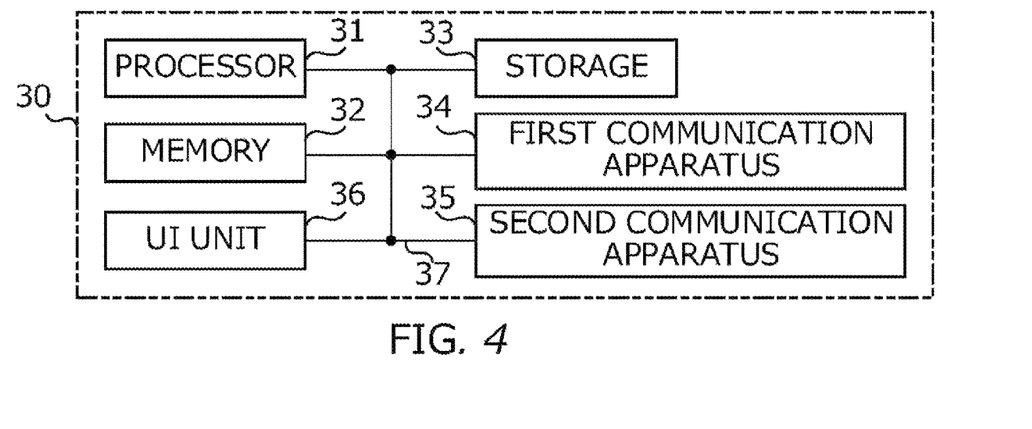
FIG. 4 is a diagram showing a hardware configuration of pilot terminal.

FIG. 4 is a diagram showing the hardware configuration of pilot terminal 30. Pilot terminal 30 is physically configured as a computer apparatus that includes processor 31, memory 32, storage 33, first communication apparatus 34, second communication apparatus 35, UI (User Interface) unit 36, bus 37, and the like. First communication apparatus 34 performs wireless communication with communication apparatus 14 of flight vehicle 10. Second communication apparatus 35 performs communication with server apparatus 20 via network 60. UI unit 36 includes a display unit that has a liquid crystal panel, a liquid crystal drive circuit, and the like, and displays images based on image data, and also includes an operation unit that has operators such as keys or a touch sensor and receives user operations and supplies signals corresponding to such operations to processor 31. The other units, namely processor 31, memory 32, storage 33, and bus 37, are similar to processor 11, memory 12, storage 13, and bus 17 that were described above, and therefore descriptions will not be given for them.

Figure 5:
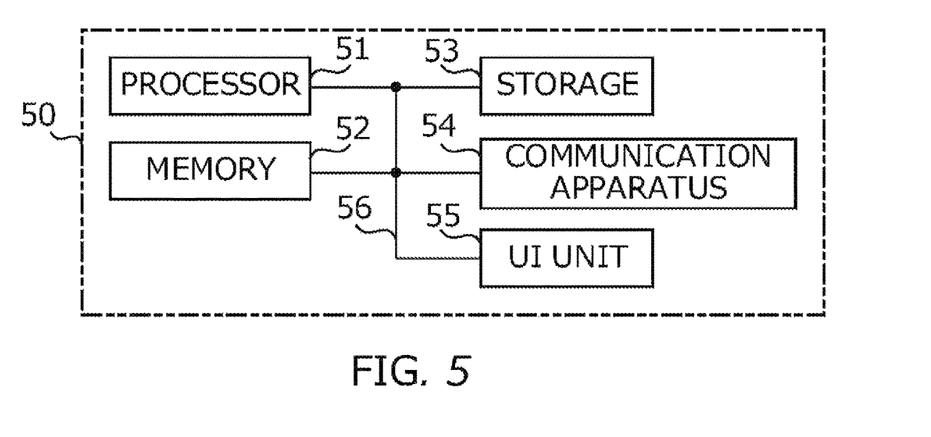
FIG. 5 is a diagram showing a hardware configuration of assister terminal.

FIG. 5 is a diagram showing the hardware configuration of assister terminal 50. Assister terminal 50 is physically configured as a computer apparatus that includes processor 51, memory 52, storage 53, communication apparatus 54, UI unit 55, bus 56, and the like. Communication apparatus 54 performs communication with server apparatus 20 via network 60. The other units, namely processor 51, memory 52, storage 53, UI unit 55, and bus 56, are similar to processor 11, memory 12, storage 13, UI unit 36, and bus 17 that were described above, and therefore descriptions will not be given for them.

Figure 6:
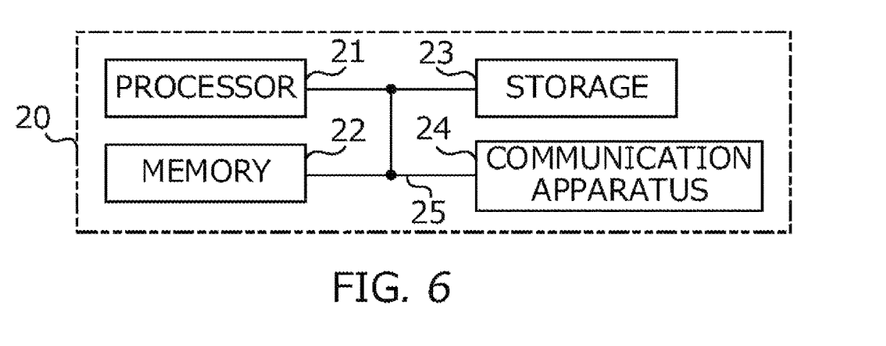
FIG. 6 is a diagram showing a hardware configuration of server apparatus.

FIG. 6 is a diagram showing the hardware configuration of server apparatus 20. Server apparatus 20 is physically configured as a computer apparatus that includes processor 21, memory 22, storage 23, communication apparatus 24, bus 25, and the like. Communication apparatus 24 performs communication with pilot terminal 30 and assister terminal 50 via network 60. Processor 21, memory 22, storage 23, and bus 25 are similar to processor 11, memory 12, storage 13, and bus 17 that were described above, and therefore descriptions will not be given for them.

Figure 7:
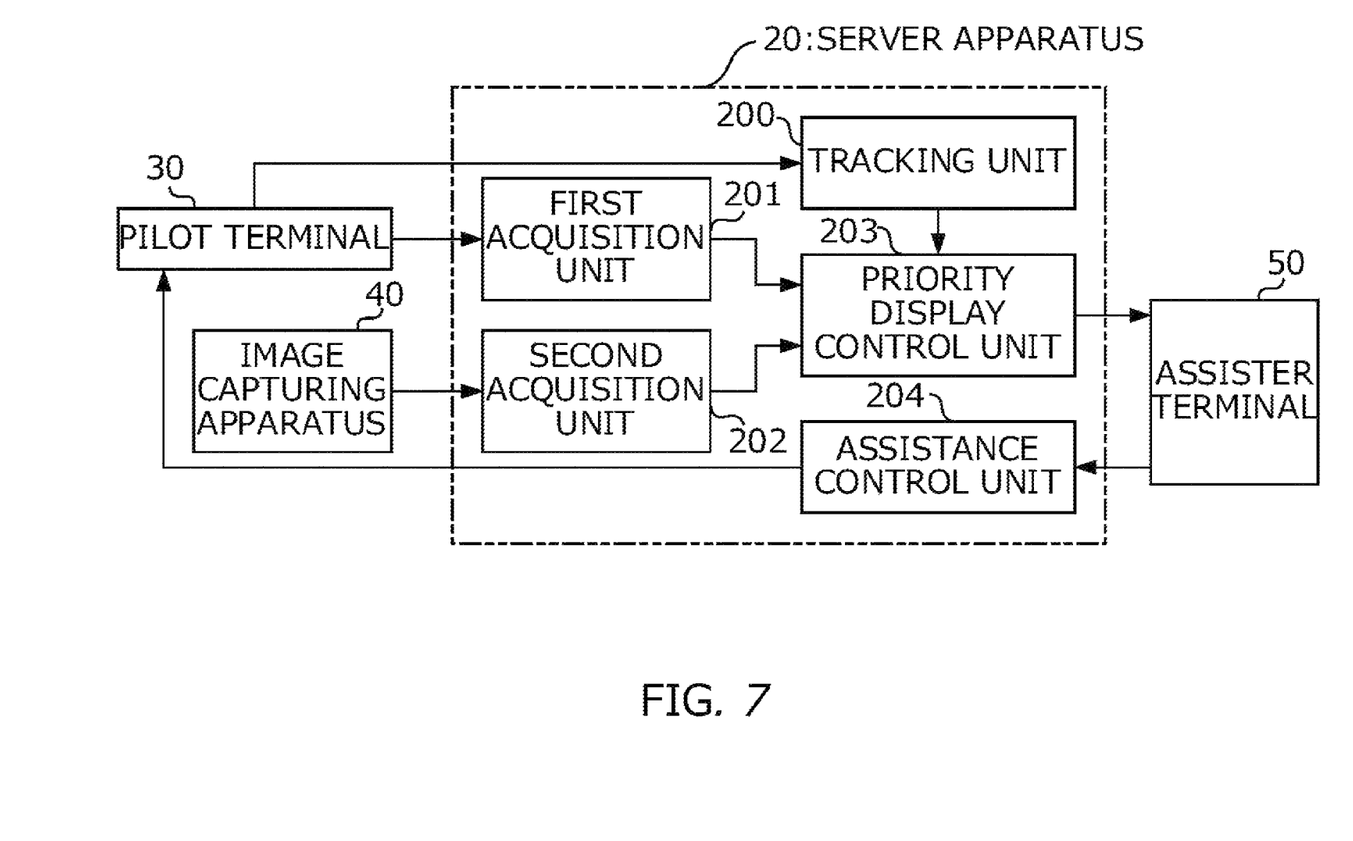
FIG. 7 is a diagram showing an example of the functional configuration of server apparatus.

FIG. 7 is a diagram showing an example of the functional configuration of server apparatus 20. Various functions of server apparatus 20 are realized by predetermined software (program) being loaded to hardware such as processor 21 and memory 22, such that processor 21 performs arithmetic computation and controls communication performed by communication apparatus 24 and the reading and/or writing of data from/to memory 22 and storage 23.

In FIG. 7, tracking unit 200 records flight vehicle identification information corresponding to flight vehicle 10 that is under control of server apparatus 20, and also records the flight status of flight vehicle 10. The flight status includes positions at which flight vehicle 10 is flying, and date/times of such positions. Tracking unit 200 records position information and date/time information that are notified by flight vehicle 10 via pilot terminal 30. Tracking unit 200 also determines whether or not the position information and the date/time information are within a flight plan that has been planned in advance, and records the determination results.

First acquisition unit 201 acquires, via pilot terminal 30, flight vehicle viewpoint images that were captured by image capturing apparatus 16 included in flight vehicle 10. Second acquisition unit 202 acquires, from image capturing apparatus 40, pilot viewpoint images of the flight of flight vehicle 10 captured by image capturing apparatus 40.

Priority display control unit 203 causes either the flight vehicle viewpoint images acquired by first acquisition unit 201 or the pilot viewpoint images acquired by second acquisition unit 202 to be displayed with priority on assister terminal 50. Priority display control unit 203 also causes information regarding the flight of the flying flight vehicle 10 to be displayed on assister terminal 50.

Assistance control unit 204 transmits, to pilot terminal 30, assistance information that corresponds to the content of operations performed by the piloting as sister on as sister terminal 50. This assistance information includes audio or text advice or instructions given by the piloting as sister to the pilot, and/or commands for controlling the actual flight of flight vehicle 10, for example. In the case where the assistance information includes commands, the commands that pilot terminal 30 has received from assistance control unit 204 of server apparatus 20 are transmitted to flight vehicle 10, and thus the flight of flight vehicle 10 is directly controlled in accordance with such commands.

Figure 8:
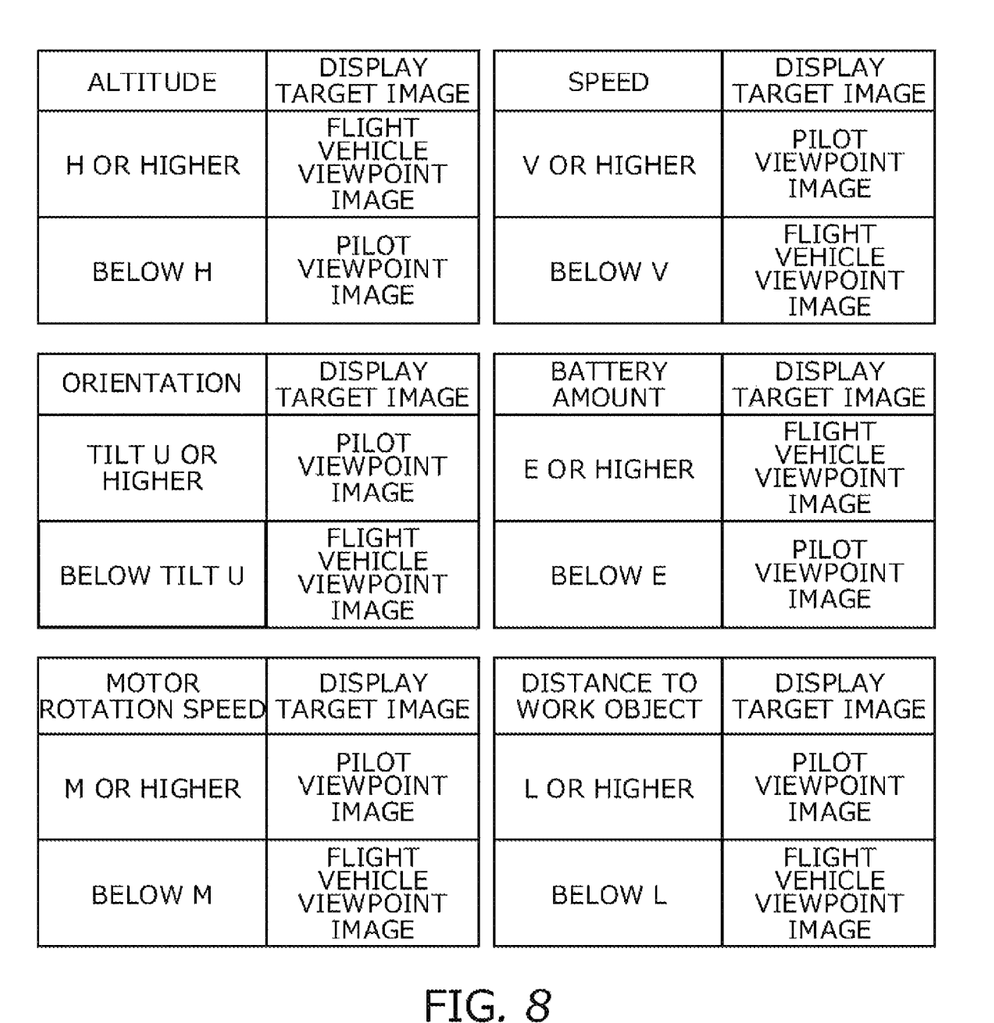
FIG. 8 is a diagram showing an example of a display image determination table.

FIG. 8 shows an example of a display image determination table having described therein conditions for determining whether either flight vehicle viewpoint images or pilot viewpoint images are to be displayed with priority on pilot terminal 50. The display image determination table is stored in storage 23 of server apparatus 20. Priority display control unit 203 determines which captured images are to be displayed with priority based on information regarding the flight of flight vehicle 10, and in the present embodiment in particular, priority display control unit 203 determines which captured images are to be displayed with priority based on an in-flight state of flight vehicle 10.

Here, in-flight states include states detected by sensor 18 of flight vehicle 10, such as the altitude, speed, orientation, battery amount, and motor rotation speeds of flight vehicle 10, as well as the distance to the work object. For example, in the case of determining which captured images are to be displayed based on the condition "altitude", the flight vehicle viewpoint images are displayed with priority if the altitude of flight vehicle 10 is greater than or equal to a threshold value H, and the pilot viewpoint images are displayed with priority if the altitude is less than the threshold value H. In other words, when the altitude of flight vehicle 10 is considered to be the condition, the determination of which captured images are to be displayed with priority is made from the viewpoint of whether the piloting assister can more easily provide assistance while viewing the flight vehicle viewpoint images or while viewing the pilot viewpoint images. According to this viewpoint, the determination of which captured images are to be displayed with priority is made in consideration of conditions other than altitude as well, namely the speed, orientation, battery amount, and motor rotation speeds of flight vehicle 10, and the distance to the work object.

Operations

Figure 9:
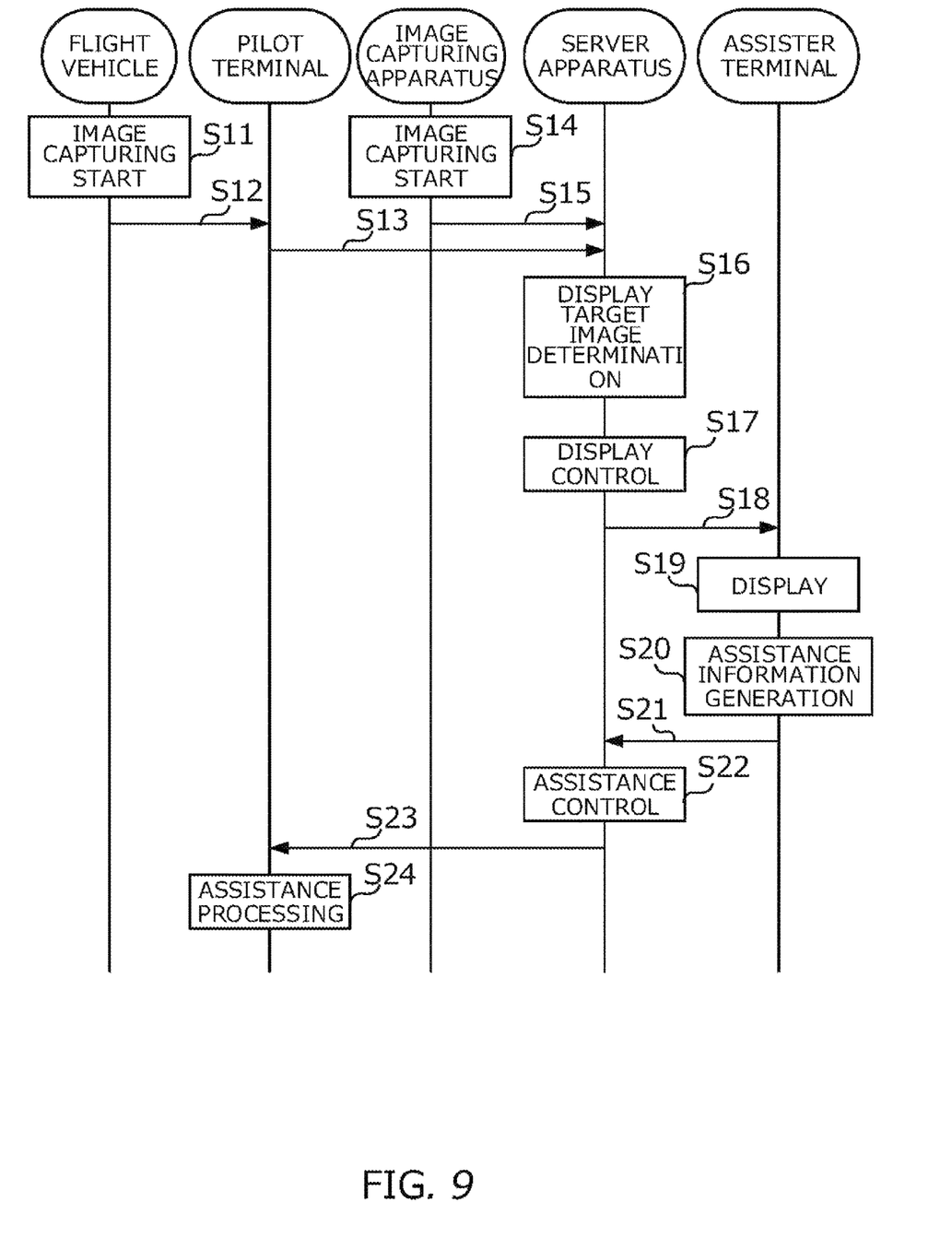
FIG. 9 is a sequence chart showing an example of operations of flight control system.

FIG. 9 is a sequence chart showing an example of operations of flight control system 1. In cases where it is described that flight vehicle 10 is performing processing in the following description, this specifically means that processing is executed by predetermined software (program) being loaded to hardware such as processor 11 and memory 12, such that processor 11 performs arithmetic computation and controls communication performed by communication apparatus 14 and the reading and/or writing of data from/to memory 12 and storage 13. The same follows for server apparatus 20, pilot terminal 30, and assister terminal 50 as well.

When flight vehicle 10 starts to fly, image capturing apparatus 16 of flight vehicle 10 starts to capture images (step S11). Moving image data including the captured images is wirelessly transmitted from communication apparatus 14 of flight vehicle 10 to pilot terminal 30 (step S12). At this time, flight vehicle 10 wirelessly transmits, from communication apparatus 14 to pilot terminal 30, flight-related information that was detected by positioning apparatus 15 and sensor 18 (including the date/time, the position of flight vehicle 10, the altitude of flight vehicle 10, the speed of flight vehicle 10, the orientation of flight vehicle 10, the battery amount of flight vehicle 10, the motor rotation speeds of flight vehicle 10, the distance between flight vehicle 10 and the work object, and the like). Pilot terminal 30 transmits, to server apparatus 20, the flight-related information and the moving image data including the captured images that were received from flight vehicle 10 (step S13). Note that flight-related information that can be generated by pilot terminal 30 (e.g., the date/time) may be generated by pilot terminal 30 and transmitted to server apparatus 20.

Also, image capturing apparatus 40 starts to capture images in accordance with a start imaging operation performed by the pilot (step S14). Moving image data including the captured images is transmitted from image capturing apparatus 40 to server apparatus 20 (step S15). Accordingly, first acquisition unit 201 of server apparatus 20 acquires flight-related information and moving image data including captured images (flight vehicle viewpoint images) from image capturing apparatus 16, and second acquisition unit 202 of server apparatus 20 acquires moving image data including captured images (pilot viewpoint images) from image capturing apparatus 40.

Priority display control unit 203 of server apparatus 20 references the display image determination table and the flight-related information and determines the captured images that are to be displayed on as sister terminal 50 (step S16). Specifically, priority display control unit 203 applies the acquired flight-related information to the display image determination table and determines that the display target is the captured images that correspond to such information. At this time, there are cases where the determined captured images differ according to various conditions, such as the flight vehicle viewpoint images being the determined display target if focus is placed on the condition "altitude", and the pilot viewpoint images being the determined display target if focus is placed on the condition "speed". At this time, the display target may be determined to be the captured images that match the highest number of conditions, for example. Furthermore, the conditions may be weighted when making a determination. For example, the weight of 1.1 may be assigned for a display target that is determined when focus is placed on the condition "altitude", and the weight of 1.3 may be assigned for a display target that is determined when focus is placed on the condition "speed".

Priority display control unit 203 of server apparatus 20 transmits the moving image data that includes the captured images determined to be the display target to assister terminal 50, thus performing display control for causing those captured images to be displayed with priority on assister terminal 50 (steps S17 and S18).

Assister terminal 50 displays images in accordance with the moving image data that includes the captured image that were determined to be the display target (step S19). Piloting assister operates assister terminal 50 while viewing such images. In accordance with operations performed by the piloting assister, assister terminal 50 generates assistance information that includes audio or text advice or instructions for the pilot, and/or commands for controlling the actual flight of flight vehicle 10 for example (step S20), and transmits the assistance information to server apparatus 20 (step S21). By transmitting the assistance information to pilot terminal 30, assistance control unit 204 performs assistance control processing (steps S22 and S23). Pilot terminal 30 outputs the assistance information and performs processing for assisting the piloting of flight vehicle 10 that is flying (step S24). Specifically, pilot terminal 30 outputs the audio or text advice or instructions to the pilot with use of UI unit 36, and transmits the commands from first communication apparatus 34 to flight vehicle 10.

According to the embodiment described above, images that are appropriate for the piloting assistance are displayed to the piloting assister with priority, and therefore the piloting assister can easily give piloting assistance from a remote location. Variations The present invention is not limited to the embodiment described above. The above-described embodiment may be modified as described below. Also, two or more of the following variations may be implemented in combination with each other.

Variation 1

The conditions for determining the display target captured images for priority display are not limited to the example of the embodiment. For example, priority display may be performed in accordance with piloting information regarding piloting operations performed by the pilot on pilot terminal 30, such as operation amounts, operation directions, and operation frequency. In this example, storage 23 stores a display image determination table having described therein piloting information-related conditions for determining whether the flight vehicle viewpoint images or the pilot viewpoint images are to be displayed with priority. When first acquisition unit 201 acquires the aforementioned pilot piloting-related information from pilot terminal 30, priority display control unit 203 references the display image determination table based on such information and determines the captured images that are to be displayed with priority. For example, the captured images that are to be displayed with priority are different between cases where the pilot piloting experience level is determined to be high based on the piloting information, or the piloting itself is easy, and cases where the pilot piloting experience level is determined to be low based on the piloting information, or the piloting itself is difficult. According to this configuration, it is possible to realize piloting assistance that corresponds to piloting content.

Variation 2

Also, the display priority determination may be made in accordance with attributes such as the piloting proficiency or the piloting experience of the pilot or the piloting assister. In this example, storage 23 stores a display image determination table having described therein conditions that are related to attributes of the pilot or the piloting as sister for determining whether the flight vehicle viewpoint images or the pilot viewpoint images are to be displayed with priority. Priority display control unit 203 identifies the pilot or the piloting assister that is logged into the system, references the display image determination table based on the attributes of the identified person, and determines the captured images that are to be displayed with priority. For example, the captured images that are to be displayed with priority are different between cases where, based on the attributes, the pilot piloting experience level is determined to be high, the piloting assister piloting experience is determined to be high, the pilot piloting experience level is determined to be low, and the piloting as sister piloting experience is determined to be low. According to this configuration, it is possible to realize piloting assistance that corresponds to such attributes.

Variation 3

The display priority determination may be made in accordance with the content of the piloting assistance provided by the piloting as sister. In this example, storage 23 stores a display image determination table having described therein piloting assistance-related conditions for determining whether the flight vehicle viewpoint images or the pilot viewpoint images are to be displayed with priority. Priority display control unit 203 acquires piloting assistance-related information (e.g., high/low assistance level, or assistance complexity/simplicity) provided by the piloting assister from assister terminal 50, references the display image determination table based on such information, and determines the captured images that are to be displayed with priority. For example, the captured images that are to be displayed with priority are different between cases where, based on the piloting assistance content, the piloting assistance level is determined to be high, or the piloting assistance itself is easy, and cases where the piloting assistance level is determined to be low, or the piloting assistance itself is difficult. According to this configuration, it is possible to realize piloting assistance that corresponds to such content of piloting assistance.

Variation 4

In a case where there are a plurality of piloting as sisters for one pilot, the priority display determination may be made as follows. Specifically, in a case where there are a plurality of assister terminals 50, priority display control unit 203 determines the captured images that are to be displayed with priority in accordance with methods determined for respective assister terminals 50. For example, in a case where first assister terminal 50 is a terminal for supporting flight of flight vehicle 10 by a pilot, and second as sister terminal 50 is a terminal for assisting image capturing performed by the pilot with use of flight vehicle 10, it is determined that the images to be displayed with priority on first as sister terminal 50 are the pilot viewpoint images, which are more useful for flight assistance, and it is determined that the images to be displayed with priority on second assister terminal 50 are the flight vehicle viewpoint images, which are more useful for image capturing assistance. The piloting assisters thus operate the respective assister terminals 50 in accordance with their own assistance objectives while viewing the respective images. According to this configuration, it is possible to realize an aspect in which a plurality of piloting as sisters can provide piloting assistance to one pilot.

Variation 5

In a case where there are a plurality of flight vehicles 10 and pilots for one piloting assister, the priority display determination may be made as follows. First acquisition unit 201 acquires captured images that were captured by image capturing apparatuses 16 included in the respective flight vehicles 10, and second acquisition unit 202 acquires captured images that show the flight of the respective flight vehicles 10. For each flight vehicle 10, priority display control unit 203 selects the captured images acquired by first acquisition unit 201 or the captured images acquired by second acquisition unit 202 in accordance with the objective of piloting assistance for each pilot, and causes the selected captured images to be displayed with priority on the terminal in the possession of the piloting assister. For example, in a case of providing flight assistance for first flight vehicle 10 to first pilot terminal 30, and providing image capturing assistance for second flight vehicle 10 to second pilot terminal 30, when providing assistance to first pilot terminal 30, the captured images that are displayed with priority on first as sister terminal 50 are the pilot viewpoint images that show the flight of first flight vehicle 10, and when providing assistance to second pilot terminal 30, the captured images that are displayed with priority on first assister terminal 50 are the flight vehicle viewpoint images that were captured by second flight vehicle 10. By operating assister terminal 50 while viewing these images, the one piloting assister can provide assistance to two pilots at the same time or alternatingly. According to this configuration, it is possible to realize a case where one piloting assister provides piloting assistance to a plurality of pilots.

Variation 6

Information related to latency in network 60 may be displayed on assister terminal 50. In other words, priority display control unit 203 may cause information related to delay in data communication between own server apparatus 20 and assister terminal 50 to be displayed on assister terminal 50. Such information is also useful in piloting assistance.

Variation 7

Captured images designated by the piloting assister may be displayed with priority on assister terminal 50. The captured images that are to be displayed with priority on as sister terminal 50 may be determined in consideration of the weather forecast.

Variation 8

Any method may be used to follow flight vehicle 10 while capturing images. Also, the method for measuring the position of flight vehicle 10 is not limited to a method employing GPS, and any method may be used. Also, a configuration is possible in which flight vehicle 10 is configured to be capable of performing communication via network 60, and flight vehicle 10 performs communication with server apparatus 20 or assister terminal 50 without passing through pilot terminal 30.

Other Variations

The block diagrams used in the above description of the embodiments shows blocks in units of functions. These functional blocks (configuration units) are realized by any combination of hardware and/or software. Furthermore, there are no particular limitations on the means for realizing the functional blocks. In other words, the functional blocks may be realized by one physically and/or logically combined apparatus, or a plurality of physically and/or logically separated apparatuses that are connected directly and/or indirectly (for example, in a wired and/or wireless manner). Also, at least some of the functions of server apparatus 20 may be implemented in pilot terminal 30 or assister terminal 50. Similarly, at least some of the functions of pilot terminal 30 or assister terminal 50 may be implemented in server apparatus 20.

The aspects/embodiments explained in the present description may also be applied to a system using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wide Band (UWB), Bluetooth (registered trademark) or another appropriate system, and/or an extended next-generation system that is based on them.

The orders in the processing procedures, sequences, flowcharts, and the like of the aspects/embodiments described in the present description may be changed as long as no contradictions arise. For example, the methods explained in the present description show various step elements in an exemplified order, and are not limited to the specific order that is shown.

The aspects/embodiments described in the present description may also be used alone or in combination, or may also be switched when they are implemented. Furthermore, the notification of predetermined information (e.g., notification of "being X") is not limited to being performed explicitly, and may also be performed implicitly (for example, notification of the predetermined information is not performed).

The terms "system" and "network" used in the present description can be used in an interchangeable manner.

The information and the parameters described in the present description may also be expressed by absolute values, relative values with respect to a predetermined value, or another type of corresponding information. For example, a radio resource may also be one indicated by an index.

The names used for the above-described parameters are in no way limiting. Furthermore, there may be a case where formulae and the like using these parameters are different from those explicitly disclosed in the present description. Various channels (such as, for example, a PUCCH and a PDCCH) and information elements (such as, for example, a TPC) can be identified by any suitable name, and thus various names assigned to these various channels and information elements are no way limiting.

The term "determining" used in the present description may include various types of operations. The term "determining" can include a case where judging, calculating, computing, processing, deriving, investigating, looking up (for example, looking up a table, a data base, or another data structure), or ascertaining is regarded as "determining". Furthermore, the term "determining" can include a case where receiving (for example, receiving information), transmitting (for example, transmitting information), inputting, outputting, or accessing (for example, accessing data in the memory) is regarded as "determining". Furthermore, the term "determining" can include a case where resolving, selecting, choosing, establishing, or comparing is regarded as "determining". In other words, the term "determining" can include a case where some operation is regarded as "determining".

The present invention may be provided as a flight control method that includes the processing steps performed in flight control system 1. Also, the present invention may be provided as a program that is executed in server apparatus 20, flight vehicle 10, pilot terminal 30, or assister terminal 50. This program may be provided in an aspect of being recorded on a recording medium such as an optical disk, or may be provided in an aspect of being downloaded to a computer via a network such as the Internet and being installed in the computer to become usable, for example.

Software, instructions, and the like may also be transmitted/received via a transmission medium. For example, if software is transmitted from a web site, a server, or another remote source using a wired technology such as a coaxial cable, an optical fiber cable, a twisted-pair wire, or a digital subscriber line (DSL), and/or a wireless technology using infrared light, radio waves, microwaves, or the like, the definition of the transmission medium will include the wired technology and/or the wireless technology.

Information, signals, and the like described in the present description may also be expressed using any of various different technologies. For example, data, an instruction, a command, information, a signal, a bit, a symbol, a chip, and the like that may be mentioned throughout the entire description above may also be expressed by an electric voltage, an electric current, an electromagnetic wave, a magnetic field or a magnetic particle, an optical field or a photon, or an arbitrary combination thereof.

Note that the terms described in the present description and/or the terms needed for understanding the present description may also be replaced by terms that have the same or similar meaning. For example, a channel and/or a symbol may also be a signal. Furthermore, a signal may also be a message. Furthermore, a component carrier (CC) may also be referred to as a carrier frequency, a cell, or the like.

All references to elements that have been given names such as "first" and "second" in the present description do not overall limit the number of such elements or the orders thereof. Such names may be used in the present description as a convenient method for distinguishing between two or more elements. Accordingly, references to first and second elements are not intended to mean that only two elements can be employed, or that the first element is required to come before the second element in some sort of manner.

The "means" in the configurations of the above-described apparatuses may be replaced by "unit", "circuit", "device", or the like.

The terms "including", "comprising", and other forms thereof are intended to be comprehensive as long as they are used in the present description or the claims, similar to the term "being provided with". Furthermore, the term "or" used in the present description or the claims is intended not to be exclusive OR.

In the entirety of the present disclosure, when articles are added through translation, for example, as "a", "an", and "the" in English, these articles also denote the plural form unless it is clear otherwise from the context.

While the present invention has been described in detail, it would be obvious to those skilled in the art that the present invention is not limited to the embodiments explained in the present description. The present invention can be implemented as corrected and modified aspects without departing from the spirit and scope of the present invention that are defined by the description of the claims. Accordingly, the present description aims to illustrate examples and is not intended to restrict the present invention in any way.

REFERENCE SIGNS LIST

1 flight control system
10 flight vehicle
20 server apparatus
21 processor
22 memory
23 storage
24 communication apparatus
200 tracking unit 201 first acquisition unit
202 second acquisition unit
203 priority display control unit
204 assistance control unit
30 pilot terminal
40 image capturing apparatus
50 assister terminal.

The invention claimed is:

1. An information processing apparatus comprising:
a first acquisition unit configured to acquire a first captured image of a viewpoint of a flight vehicle, the first captured image captured by a first image capturing apparatus provided in a flight vehicle;
a second acquisition unit configured to acquire a second captured image of flight of the flight vehicle from a viewpoint of a pilot operating the flight vehicle captured by a second image capturing apparatus; and
a priority display control unit configured to cause the first captured image acquired by the first acquisition unit or the second captured image acquired by the second acquisition unit to be displayed with priority, based on information related to the flight of the flight vehicle, on a terminal used by a piloting assister who assists the pilot with piloting the flight vehicle.

2. The information processing apparatus according to claim 1,
wherein the priority display control unit determines which of the first captured image and the second captured image to be displayed with priority based on an in-flight state during flight of the flight vehicle.

3. The information processing apparatus according to claim 1,
wherein the priority display control unit determines which of the first captured image and the second captured image to be displayed with priority based on information related to piloting performed by the pilot.

4. The information processing apparatus according to claim 1,
wherein the priority display control unit determines which of the first captured image and the second captured image to be displayed with priority based on a piloting-related attribute of the pilot or the piloting assister.

5. The information processing apparatus according to claim 1,
wherein the priority display control unit determines which of the first captured image and the second captured image is to be displayed with priority based on information related to piloting assistance provided by the piloting assister.

6. The information processing apparatus according to claim 1,
wherein in a case where there are a plurality of the terminals for a piloting assister, for each of the terminals, the priority display control unit determines which of the first captured image and the second captured image and to be displayed with priority in accordance with a method determined for the terminal.

7. The information processing apparatus according to claim 1,
wherein the priority display control unit further causes information related to flight of the flying flight vehicle to be displayed on the terminal for the piloting assister.

8. The information processing apparatus according to claim 1,
wherein the priority display control unit further causes information related to delay in data communication between own apparatus and the terminal for the piloting assister to be displayed on the terminal for the piloting assister.

9. The information processing apparatus according to claim 1, wherein in a case where there are a plurality of the flight vehicles and the pilots,
the first acquisition unit acquires first captured images of a viewpoint of each flight vehicle, the captured images captured by the first image capturing apparatus provided in each of the plurality of flight vehicles,
the second acquisition unit acquires captured second images flight of each of the plurality of flight vehicles from a viewpoint of each respective pilot operating one of the plurality of flight vehicles from a viewpoint of each respective pilot operating one of the plurality of flight vehicles captured by a respective second image capturing apparatus, and the second acquisition unit in accordance with an objective of piloting assistance for the pilot of the respective flight vehicle, and causes the selected captured image to be displayed with priority on the terminal used by the piloting assister to assist each pilot with piloting their respective flight vehicle.

10. The information processing apparatus according to claim 1, wherein the flight vehicle is remotely controlled.

11. The information processing apparatus according to claim 1, wherein the flight vehicle is a drone.

12. The information processing apparatus according to claim 1, further includes an assistance control unit configured to transmit assistance from the terminal used by the piloting assister to the pilot.

13. The information processing apparatus according to claim 12, wherein the transmitted assistance includes commands for controlling the actual flight of the flight vehicle.

14. The information processing apparatus according to claim 1, wherein the second image capturing apparatus is disposed separate from the flight vehicle.

15. The information processing apparatus according to claim 1, wherein the terminal used by the piloting assister is disposed remote from the flight vehicle.

16. The information processing apparatus according to claim 1, wherein the priority display control unit is further configured to:
cause one of the first captured image acquired by the first acquisition unit and the second captured image acquired from the second acquisition unit to be displayed with priority, and causes the other captured image to be hidden.

17. The information processing apparatus according to claim 1, wherein the information related to the flight includes at least one of an altitude of the flight vehicle, a speed of the flight vehicle, an orientation of the flight vehicle, a battery amount of the flight vehicle, motor rotation speeds of the flight vehicle, and a distance of the flight vehicle to a work object; and
wherein the priority display control unit causes the first captured image acquired by the first acquisition unit to be displayed with priority when a result of comparing the information related to the flight and a threshold value is a first result, and causes the second captured image acquired by the second acquisition unit to be displayed with priority when the result is a second result different from the first result.

18. The information processing apparatus according to claim 1, wherein the information related to the flight includes an altitude of the flight vehicle, and
wherein the priority control unit causes the first captured image acquired by the first acquisition unit to be displayed with priority when the altitude is greater than or equal to a threshold value, and causes the second captured image acquired by the second acquisition unit to be displayed with priority when the altitude is less than the threshold value.

19. The information processing apparatus according to claim 1, wherein the information related to the flight includes at least two of an altitude of the flight vehicle, a speed of the flight vehicle, an orientation of the flight vehicle, a battery amount of the flight vehicle motor rotation speeds of the flight vehicle, and a distance of the flight vehicle to a work object, and wherein the priority display control unit determines at least one candidate to be displayed with priority from the first captured image acquired by the first acquisition unit and the second captured image acquired by the second acquisition based on each of the at least two of the altitude, the speed, the orientation, the battery amount, the motor rotation speeds, and the distance, and causes one of the first captured image acquired by the first acquisition unit and the second captured image acquired by the second acquisition unit to be displayed with priority, the number that the one is determined as the candidate being greater than the number that the other is determined as the candidate.

20. An information processing apparatus comprising:

a processor configured to:
- acquire a captured image of a viewpoint of a flight vehicle, the captured image captured by a first image capturing apparatus provided in the flight vehicle,
- acquire a captured image of flight of the flight vehicle from a viewpoint of a pilot operating the flight vehicle captured by a second image capturing apparatus; and
- cause the captured image captured by the first image capturing apparatus or the captured image captured by the second image capturing apparatus to be displayed with priority, based on information related to the flight of the flight vehicle, on a terminal used by a piloting assister who assists the pilot with piloting the flight vehicle.

* * * * *

UNITED STATES PATENT AND TRADEMARK OFFICE
CERTIFICATE OF CORRECTION

PATENT NO. : 11,167,846 B2  
APPLICATION NO. : 16/753411  
DATED : November 9, 2021  
INVENTOR(S) : Hiroshi Nakagawa et al.

It is certified that error appears in the above-identified patent and that said Letters Patent is hereby corrected as shown below:

In the Claims

• Column 14, Line 12, in Claim 9, please insert the word --of-- after "images";

• Column 14, Lines 14-16, in Claim 9, please delete "from a viewpoint of each respective pilot operating one of the plurality of flight vehicles";

• Column 14, Line 17, in Claim 9, add a paragraph break after the word "and"; and

• Column 14, Line 17-18, in Claim 9, after the paragraph break, please insert --for each of the plurality of flight vehicles, the priority display control unit selects the first captured image acquired by the first acquisition unit or the second captured image acquired by--.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*